United States Patent [19]

Phillips

[11] 3,910,857
[45] Oct. 7, 1975

[54] HIGH COMPRESSIVE STRENGTH ADHESIVE

[75] Inventor: Warren G. Phillips, Shelton, Conn.

[73] Assignee: Avco Corporation, Stratford, Conn.

[22] Filed: Nov. 2, 1973

[21] Appl. No.: 412,392

[52] U.S. Cl. .............. 260/38; 156/330; 156/331; 156/335; 260/37 M; 260/37 N
[51] Int. Cl.² ..................... C08K 3/08; C08K 3/22
[58] Field of Search ....... 416/134, 213, 219, 241 A; 260/37 M, 37 EP, 37 N, 38; 156/330, 331, 335

[56] References Cited
UNITED STATES PATENTS

| | | | |
|---|---|---|---|
| 2,868,767 | 1/1959 | Cyba et al. | 260/37 EP X |
| 3,144,349 | 8/1964 | Swingler et al. | 416/241 X |
| 3,155,743 | 11/1964 | Newey | 260/37 |
| 3,170,890 | 2/1965 | Boyd et al. | 260/37 EP |
| 3,212,946 | 10/1965 | Weller et al. | 156/330 X |
| 3,224,501 | 12/1965 | Burdick et al. | 260/37 M X |
| 3,256,135 | 6/1966 | Weinheimer et al. | 260/37 EP X |
| 3,317,988 | 5/1967 | Endres | 416/219 UX |
| 3,502,618 | 3/1970 | Velzmann | 156/330 X |
| 3,522,121 | 7/1970 | Lovelock et al. | 156/330 X |
| 3,758,232 | 9/1973 | Wallett | 416/213 |
| 3,784,320 | 1/1974 | Rossmann et al. | 416/219 X |

FOREIGN PATENTS OR APPLICATIONS

| | | | |
|---|---|---|---|
| 254,599 | 12/1962 | Australia | 416/134 |
| 528,068 | 8/1921 | France | 416/134 |
| 1,911,812 | 10/1969 | Germany | 416/134 |
| 1,110,217 | 4/1968 | United Kingdom | 416/241 A |

*Primary Examiner*—Donald E. Czaja
*Assistant Examiner*—S. M. Person
*Attorney, Agent, or Firm*—Charles M. Hogan; Irwin P. Garfinkle; Lawrence I. Field

[57] ABSTRACT

An adhesive composition which exhibits excellent strength properties when subjected to compressive stresses.

5 Claims, No Drawings

HIGH COMPRESSIVE STRENGTH ADHESIVE

In the manufacture of many articles the final product is made by assembling two or more fabricated parts and then securing them to each other by means of an adhesive. Most common adhesives are formulated to perform well when subjected to tension or shear stresses. Unfortunately in many assemblies the adhesive is subjected to compression rather than tension and crumbles or fails in other ways.

This invention is addressed to an adhesive composition which exhibits excellent properties in compression and which is therefore of particular utility when used to secure the roots of blades of a compressor in a mounting disc, as in a gas turbine, and as more fully described in a patent application filed on an invention entitled "Compressor Wheel Assembly" filed concurrently with the present application.

The adhesive composition of the present invention consists essentially of the following in parts by weight:

|   | Range | Preferred |
|---|---|---|
| Thermosetting Resin | 20–60 | 50 |
| Curing Agent |  | 50 |
| Accelerator |  | 0.5 |
| Thickening Agent |  | 3 |
| Filler | 80–40 | 50 |

One specific example of a suitable adhesive composition comprised an epoxy system including the following in parts by weight:

| | |
|---|---|
| Epoxy novolac resin (DEN 438) | 100 |
| Curing Agent-Nadic methyl anhydride | 100 |
| Accelerator - dimethylaminomethyl-phenol (DMP 30) | 1 |
| Thickening or Dispersing Agent-Fumed Silica | 6 |
| Filler - 1:1:1 mixture Al + $Al_2O_3$ + $Fe_3O_4$ | 200 |

Other resins which have been found suitable include Epon 154 (Shell), EPN 1138 (Ciba) and phenolic or polyimide resins, although epoxy novolac resins are preferred.

Suitable curing agents for each resin system are known and include a variety of organic anhydrides and other unsaturated compounds, and the same is true for the accelerator. The above composition was initially cured by heating to approximately 350°F and held at 350° for 1 hour. The assembly was then given a final post cure in a hot air oven at 400°F for 18 hours.

The function of the thickening agent is to maintain the filler particles dispersed uniformly throughout the composition. In the absence of any such additive, the filler particles tend to settle and the resulting composition then exhibits unequal strength properties. A preferred thickening agent is a silica sold by Cabot Corporation under the name Cab-O-Sil and believed to be a fume produced by burning $SiCl_4$.

In order to obtain the desired high compressive strength, the resin is filled with an equal weight of inorganic filler material, the same being a mixture of metals and metal oxides in specific proportions.

Utilizing the preferred proportions specified above, with the preferred resin, curing agent, accelerator and thickening agent, the following is a comparison of the room temperature compressive strengths obtained with individual fillers and with mixtures of fillers, tests being made on buttons 0.600 inches diameter and 0.250 inches thick:

| Filler: Resin Mixture | Compressive Strength (ksi) |
|---|---|
| 0:1 (none) | 40.5 |
| 1:1 $Al_2O_3$ (minus 320 mesh) | 48.4 |
| 1:1 $Fe_3O_4$ (minus 100 mesh) | 62.0 |
| 1:1 Al (minus 100 mesh) | 63.1 |
| 1:1 (1:1:1 mixture of $Al_2O_3$+$Fe_3O_4$+Al) | 78.1 |

From this it will be seen that a filler which comprises a mixture of both metals and metal oxides gives a stronger adhesive than the use of either filler alone.

Although equal proportions of the three preferred fillers have been found to be exceptionally effective, other proportions could be utilized as follows:

| FILLER | RANGES | EXAMPLE |
|---|---|---|
| Al | 10–35% | 20% |
| $Al_2O_3$ | 20–80% | 50% |
| $Fe_3O_4$ | 10–35% | 30% |

Other powdered metals may be substituted for the aluminum and other oxides may be used in place of those preferred, but the results obtained with such substituents are significantly inferior to the compressive strenghts obtained with the preferred filler mixtures of Al, $Al_2O_3$ and $Fe_3O_4$.

Having now described preferred embodiments of the invention, it is not intended that it be limited except as may be required by the appended claims.

I claim:

1. An adhesive consisting essentially of thermosetting resin and an inorganic filler and having a high compressive strength when set, wherein the thermosetting resin is selected from the group consisting of epoxy, phenolic and polyimide resins and wherein the filler consists of a mixture of metal and metal oxide and the proportions of resin are 60 to 20 parts by weight for each 40 to 80 parts by weight of filler and wherein the filler consists of a mixture of Al, $Al_2O_3$ and $Fe_3O_4$ in the ranges of 10–35%, 20–80% and 10–35% respectively.

2. The adhesive of claim 1 wherein the filler consists of a mixture of Al, $Al_2O_3$ and $Fe_3O_4$ in the ranges of 10–35%, 20–80% and 10–35% respectively, and the filler and resin are present in substantially equal amounts by weight.

3. The adhesive of claim 2 wherein the filler consists of approximately 20% Al, 50% $Al_2O_3$ and 30% $Fe_3O_4$, by weight.

4. The adhesive of claim 2 wherein the resin is an epoxy novolac.

5. The adhesive of claim 2 including in addition a curing agent and a thickening agent.

* * * * *